July 21, 1925. Re. 16,122

F. V. RISINGER

RADIANT

Original Filed Sept. 9, 1922

Witness:
C. H. Wagner.

INVENTOR
Frank V. Risinger

By Robb Robb & Hill
Attorneys

Reissued July 21, 1925.

Re. 16,122

UNITED STATES PATENT OFFICE.

FRANK V. RISINGER, OF LAKEWOOD, OHIO.

RADIANT.

Original No. 1,486,036, dated March 4, 1924, Serial No. 587,172, filed September 9, 1922. Application for reissue filed February 26, 1925. Serial No. 11,894.

*To all whom it may concern:*

Be it known that I, FRANK V. RISINGER, a citizen of the United States, and a resident of Lakewood, in the county of Cuyahoga and State of Ohio, have invented new and Improved Radiants, of which the following is a full, clear, and exact description.

This invention relates to improvements in radiants and more particularly to a heating element for use in gas stoves, which is known on the market as a radiant, an object of the invention being to provide a radiant which is relatively broad, and relatively narrow in depth, whereby a greater area of radiating surface and minimum obstruction to the flame is had, and also a larger number of radiating points may be provided and brought in contact with the flame, thus effecting greater heat radiation than is possible with radiants heretofore known.

A further object is to provide a radiant of the character stated, which while presenting the maximum radiating surface requires but a minimum of fuel, thus resulting in economy and greater efficiency in a given space.

A further object is to provide a radiant which insures the entire surface of the radiant becoming brilliantly and evenly heated, the upper portion being as equally radiant as the bottom, this being due in part to the fact that the openings in the front of the radiant are largest at the lower portion of the radiant and decrease in size to the upper end of the radiant, thereby tending to offer less outlet as the flame moves upwardly and provide sufficient inclosure to insure a brilliant radiation throughout.

A further object is to provide a radiant which functions to throw the heat forward, and which dispenses with the necessity for the ordinary clay backing, and which facilitates the assemblage of any desired number of radiants side by side to give the desired heating surface.

A further object is to provide improved means for constructing and assembling the radiants in a stove.

A further object is to provide a radiant with improved construction and arrangement of back and radiating points, which not only facilitates the formation of the perfect radiant with the desired number of points, but also provides stronger and better radiating points, and gives superior results to radiants as heretofore made.

With these and other objects in view, the invention consists in certain novel features of construction and combinations, and arrangements of parts, as will be more fully hereinafter described and pointed out in the claims.

In the accompanying drawings,—

Figure 1:
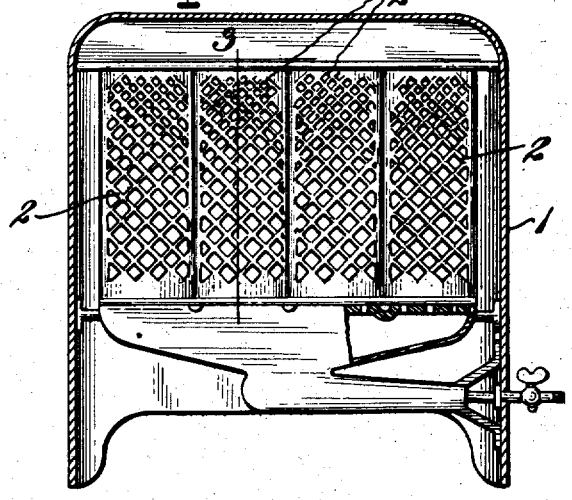
Figure 1 is a view partly in section of a stove showing my improved radiants in elevation therein.
Figure 6:
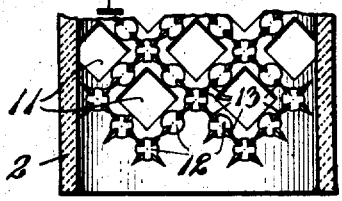
Figure 6 is a fragmentary view in transverse section of the radiant looking forwardly at the rear of the front portion of the radiant.

1 represents a stove which may be of any desired shape and size, and which constitutes a gas burner or heater, and which is provided with a series of any desired number of my improved radiants 2.

The radiants 2 are hollow and have parallel side walls 3—3 so that the radiant is of uniform width throughout its height and is appreciably wider than ordinary radiants in general use. The radiant is open at its lower end for the admission of the flame from any desired arrangement of gas burners, and is closed at its upper end. The back wall 4 of the radiant extends above the top of the radiant forming a flange 5 which projects the entire width of the radiant and is adapted to receive an overhanging lip 6 on a back plate 7, to hold the radiants in proper vertical position.

The back of the radiant is flush with the plate 7 throughout the edges of the radiant, but the intermediate portion of the back is recessed and provided with longitudinal and transverse corrugations or ribs 8 and 9, whereby dead air spaces are formed between the back wall of the radiant and the plate 7 to act as heat insulators and obviate the necessity of providing the ordinary clay backing in the stove.

Furthermore, this arrangement and construction facilitates the assemblage of the radiants and reduces the cost of manufacture and the expense of operation and repair.

The back wall 4 of the radiant is vertical while the front wall 10 of the radiant inclines rearwardly from its lower to its upper end, thus reducing the cross sectional area from the lower to the upper end of the radiant. This front 10 of the radiant is formed with any desired design or configuration of openings 11 and it wil be noted that these openings 11 are largest at the lower portion of the radiant and gradually diminish in size from the lower to the upper portion of the radiant, thus serving to gradually decrease the outlets from the lower to the upper portion, and insure a full radiation throughout the length of the radiant.

The upward taper of the interior passage of the radiant and the gradual decrease in the size of the openings in the front of the radiant from the bottom toward the top thereof are carefully and accurately proportioned or graduated to gradually offer less outlet to the flame as it moves upwardly so that a balance is obtained and the heating of the radiant will be substantially uniform from top to bottom and the top will be just as bright as the bottom.

Figure 7:
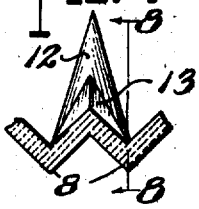
Figure 7 is an exaggerated view in transverse section illustrating one of the radiating points and a portion of the back plate.
Figure 8:
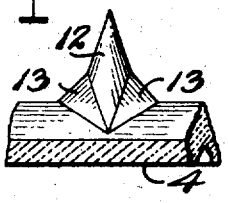
Figure 8 is a view in section on the line 8—8 of Figure 7.

Within the radiant and integral with the front and rear walls 10 and 4 thereof, I provide a large number of radiating points 12, one of these points being shown enlarged and more or less exaggerated in Figures 7 and 8, and I would call special attention to the shape of the point which is sharp and tapering, and which is provided with integral webs 13 at opposite sides of its base, which are disposed at an angle to the point, and also at an angle to the supporting front or back as the case may be, whereby the points can be readily formed in and withdrawn from the point forming openings of a suitable die member.

Figure 2:
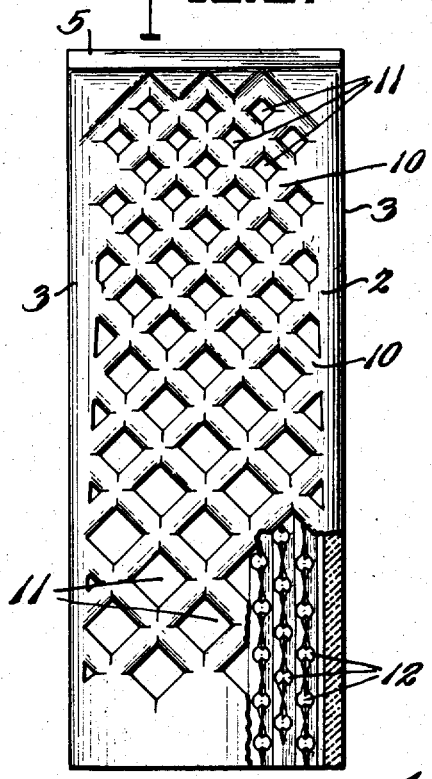
Figure 2 is a view mainly in front elevation of my improved radiant partly broken away.
Figure 3:
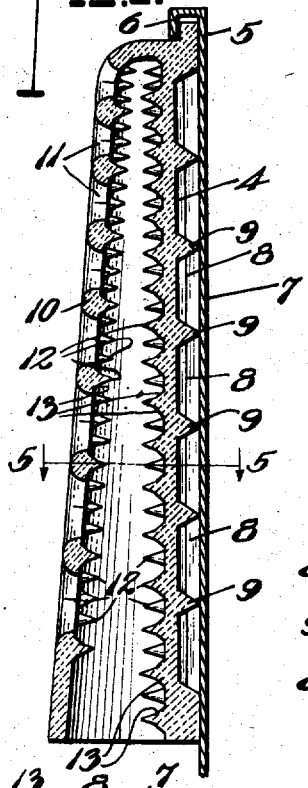
Figure 3 is a view in longitudinal section through the radiant and its backing plate, the section being taken on the line 3—3 of Figure 1.
Figure 4:
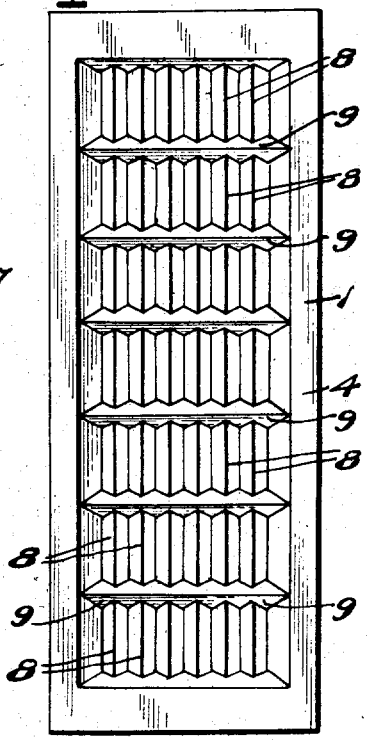
Figure 4 is a view in rear elevation of my improved radiant.
Figure 5:
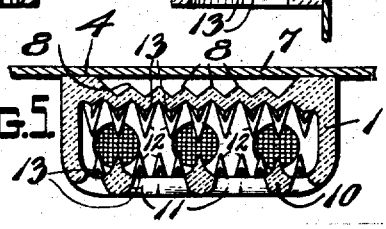
Figure 5 is a view in transverse section on the line 5—5 of Figure 3.

These webs are angular in transverse section and not only give strength and durability to the radiating point, but they, by reason of their shape and location, facilitate the molding or casting of the points. As will be apparent from an inspection of Figures 7 and 8 and the lower right hand corner of Figure 2, the radiating points 12 at the back of the radiant project from the vertical webs 8 so that the points are additionally reinforced and are arranged in longitudinal rows with vertical channels between the same, thereby facilitating the upward circulation of the flame and products of combustion between the points and the effective heating of the points to incandescence.

To be more specific: In the manufacture of radiants of this character, the walls are formed by metal dies and under pressure, and to prevent sticking, the surface of the metal must be oiled, and in feeding the clay or other material forming the radiant, the oil will run into the spaces in which the points are formed and by providing these spaces of the shape corresponding to the shape of the points and webs above described, the material of the radiant can be squeezed or forced laterally without carrying a film of the oil across the mouth of the point forming openings and thereby separating the clay which has previously entered the opening from the mass of clay forming the body of the radiant by a film of oil, with the result that none of the points will be missing from the finished radiant.

The integral webs 13 at the base of the radiating points 12 not only reinforce the points, but enable a radiant which is comparatively wide in proportion to its depth and width to be manufactured. As previously explained, in the manufacture of a radiant the plastic clay is applied to the die and forced or spread laterally over the same by pressure. The face of the die is initially oiled and the clay which may enter a point forming opening in the die may be separated by a shearing action from the mass of the clay as the latter is forced laterally over the die and a thin film of oil carried by the moving mass of clay over the clay in the point forming opening, with the result that the point will be missing on the finished radiant. This separation and absence from the radiant of the points ordinarily becomes more noticeable as the width of the radiant becomes greater, because the clay must be forced laterally a greater distance to cover the die, so that with the ordinary small points it has not been found possible to make a wide radiant, although a wide radiant is preferable to a narrow radiant, because it offers less frictional resistance to the upward movement of the flame within the radiant. The webs 13 and vertical ribs 8 from which the points project cause the radiating points to have a large and flared base so that the points have a firmer bond with the body of the radiant. Furthermore, the point forming openings in the die have enlarged and flared mouths and the lateral movement of the clay across the die when manufacturing the radiants carries it downwardly and upwardly through the flared mouths of the point forming openings instead of merely across the top of the small opening, with the result that the said movement of the clay does not result in separating the clay which has already entered a point forming opening from the mass of the clay and a wide radiant can be manufactured with a full number of the radiating points.

With radiants such as heretofore made, it is quite impossible to form all of the points desired because, as previously explained, the oil interferes with the operation, and by constructing the points of the shape set forth this defect is entirely overcome. By reason of the construction and arrangement of parts above described, I am enabled to form a radiant which is efficient in its operation, which is of greater width than radiants such as heretofore made, and which insures a full radiation throughout the entire height of the radiant.

In this construction large openings are formed at the bottom of the radiant to permit the greatest possible buoyancy to the flame passing upwardly within the radiant, and the graduated openings provide a means for proportionately reducing the outlet from the bottom to the top so that there will be an even distribution of heat within the radiant, thereby increasing the area and glow of the clay surface being heated. Without the graduated openings in the radiant the heat would pass to the top and only the top portion of the radiant would be heated sufficiently to glow. It is most essential for the graduated openings to be properly proportioned with exactness for otherwise it is not possible to obtain an even balance of the glow over the surface of the radiant.

Various slight changes may be made in the general form and arrangement of parts described, without departing from my invention, and hence I do not limit myself to the precise details set forth, but consider myself at liberty to make such changes and alterations as fairly fall within the spirit and scope of the appended claims.

I claim:

1. A radiant having parallel closed sides, inclined perforated front and straight recessed back, whereby dead air spaces are formed at the back of the radiant.

2. A radiant of the character described, having openings in its front, dead air spaces in its back, and having internal radiating points on its front and back.

3. A radiant comprising a hollow body having openings in its front, and having longitudinal and transverse webs on its rear face forming dead air spaces.

4. A radiant having a relatively wide closed back, a relatively wide perforated front, parallel closed sides connecting the back and front, internal radiating points on the front and the back, and angular inclined webs at opposite sides of the points and integral with the points and their supports.

5. A radiant comprising a hollow body having a straight rear wall provided with recesses on its outer face, and an inclined front wall provided with openings, the openings gradually decreasing in size from the bottom to the top, the front and rear walls being provided on their inner faces with radiating projections.

6. A radiant comprising a hollow body open at the bottom and having a straight rear wall provided on its outer face with tapering intersecting ribs forming a plurality of recesses, and an inclined front wall provided with openings, the said openings decreasing in size from the bottom to the top, the front and rear walls being provided on their inner faces with tapering projections.

7. A radiant comprising an elongated front having arranged therein a series of openings extending throughout its length, said openings gradually decreasing in size from its bottom to its top, and the decrease in the size of the openings being properly proportioned to feed a gradually decreased amount of air to the interior as may be necessary to maintain a uniform combustion throughout the length of the radiant, and heat the radiant substantially uniformly from end to end.

8. A radiant comprising a vertically arranged front and having its lower end in communication with the fuel supply, the said front having arranged therein a plurality of openings which gradually decrease in size from the bottom of the radiant to the top thereof, said decrease in the size of the openings being properly proportioned to admit air in gradually decreased amounts from the bottom of the radiant to the top thereof as is required by the fuel to maintain uniform combustion throughout the length of the radiant and cause a substantially uniform heating of the radiant from end to end.

9. A radiant comprising an elongated hollow body having an air space formed in the back thereof and cut off from communication with the interior of the body to insulate the radiant from a backing member.

10. A radiant comprising a hollow body having interior radiating points, said points being integral with the body and having enlarged integral bases, the points and bases tapering toward the ends of the points so that they can be readily withdrawn from a die.

11. A radiant comprising a hollow body having interior radiating points, said points having base portions which are flared on opposite sides thereof to form reinforcing webs, the points and webs being integral with the body and tapering toward the ends thereof so that they can be readily withdrawn from a die.

12. A radiant comprising a hollow body having interior radiating points, said points being flared at the base thereof to provide angular and inclined reinforcing webs, the points and webs being integral with the body and being tapered toward the ends thereof so that they can be readily withdrawn from a die.

13. A radiant comprising a hollow body formed with a series of interior ribs and radiating points projecting from the said ribs.

14. A radiant comprising an elongated hollow body formed with a series of longitudinally extending interior ribs providing channels extending longitudinally of the radiant, and longitudinally rows of radiating points projecting from the ribs.

15. A radiant comprising an elongated body portion having an interior passage which tapers gradually toward the upper end thereof, said radiant being formed with a longitudinally extending series of openings in the front thereof and said openings being gradually and uniformly decreased in size from the bottom toward the top of the radiant, the taper in the size of the passage presenting less surface to be heated as the flame rises and the decrease in the size of the openings being properly proportioned to feed a gradually decreased amount of air to the interior of the radiant as is necessary to maintain uniform combustion substantially throughout the length of the radiant and heat the radiant substantially from end to end.

In testimony whereof I affix my signature.

FRANK V. RISINGER.